(12) United States Patent
Chen

(10) Patent No.: US 9,661,487 B2
(45) Date of Patent: May 23, 2017

(54) METHOD OF GENERATING DISCOVERY CODE FOR NETWORK ENTITY AND NETWORK ENTITY USING THE SAME

(71) Applicant: Acer Incorporated, New Taipei (TW)

(72) Inventor: Pei-Jung Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/834,462

(22) Filed: Aug. 25, 2015

(65) Prior Publication Data

US 2016/0205531 A1 Jul. 14, 2016

(51) Int. Cl.

| | |
|---|---|
| *H04B 7/00* | (2006.01) |
| *H04W 8/00* | (2009.01) |
| *H04W 4/00* | (2009.01) |
| *H04W 48/14* | (2009.01) |
| *H04W 48/16* | (2009.01) |
| *H04W 4/02* | (2009.01) |

(52) U.S. Cl.
CPC .......... *H04W 8/005* (2013.01); *H04W 4/008* (2013.01); *H04W 8/00* (2013.01); *H04W 48/14* (2013.01); *H04W 48/16* (2013.01); *H04W 4/023* (2013.01)

(58) Field of Classification Search
None
See application file for complete search history.

(56) References Cited

U.S. PATENT DOCUMENTS

2014/0341121 A1* 11/2014 Chang ................. H04W 40/246
370/329
2014/0344578 A1 11/2014 Kim et al.

OTHER PUBLICATIONS

"3rd Generation Partnership Project; Technical Specification Group Services and System Aspects; Proximity-based services (ProSe); Stage 2 (Release 12)," 3GPP TS 23.303, V12.1.0, Jun. 2014.
"3rd Generation Partnership Project; Technical Specification Group Core Network and Terminals; Numbering, addressing and identification (Release 12)," 3GPP TS 23.003, V12.4.0, Sep. 2014.
"3rd Generation Partnership Project; Technical Specification Group Core Network and Terminals; Proximity-services (ProSe) User Equipment (UE) to ProSe function protocol aspects; Stage 3 (Release 12)," 3GPP TS 24.334, V12.1.1, Jan. 2015.

* cited by examiner

*Primary Examiner* — Mohammed Rachedine
(74) *Attorney, Agent, or Firm* — Jianq Chyun IP Office

(57) ABSTRACT

A method of generating discovery code for a network entity and a network entity using the same method are provided. In one of the exemplary embodiments, this disclosure is directed to a generating method that is applicable to a network entity and includes at least but not limited to selecting a first substring in a ProSe application code of an announcing UE and a second substring in a ProSe application code of a monitoring UE for a D2D discovery, generating a matching string and a non-matching string according to the first substring and the second substring, and generating a ProSe application mask according to the matching string and the non-matching string.

20 Claims, 3 Drawing Sheets

METHOD OF GENERATING DISCOVERY CODE FOR NETWORK ENTITY AND NETWORK ENTITY USING THE SAME

CROSS REFERENCE TO RELATED APPLICATION

This application claims the priority benefit of U.S. provisional application Ser. No. 62/101,386, filed on Jan. 9, 2015. The entirety of the above-mentioned patent application is hereby incorporated by reference herein and made a part of specification.

BACKGROUND OF THE DISCLOSURE

1. Field of the Disclosure

The present disclosure generally relates to a method of generating discovery code for a network entity and a network entity using the same method.

2. Description of Related Art

In the field of D2D communication which is often referred to as a Proximity-based Services (ProSe) communication, a user equipment (UE) typically may discover another UE and subsequently performs D2D communication with another UE with or without the assistance of a core network such as an Evolved Packet Core (EPC). The aforementioned case such as discovering another UE by using direct radio signal without assistance of core network is called "direct discovery". When the proximity discovery procedure occurs in direct discovery, an announcing UE and a monitoring UE would send discovery request to a network entity such as a ProSe function in the EPC network for announcing and monitoring the proximity discovery, respectively. The ProSe Function is the logical function that is used for network related actions required for ProSe. The ProSe Function plays different roles for each of the features of ProSe. Then, the monitoring UE would check whether a match event occurred. An announcing UE means a UE announces certain information that could be used by UE in proximity that has permission to discover. A monitoring UE means a UE that monitors certain information of interest in proximity of announcing UEs.

There are two kinds of ProSe direct discovery, which are an open discovery and a restricted discovery. The open discovery is case where there is no explicit permission that is needed from the UE being discovered, whereas the restricted discovery only takes place with explicit permission from the UE that is being discovered. For example, when a user wants to find his/her friends on a social network application, his/her device will perform the restricted discovery.

A direct discovery procedure may involve different types of discovery codes. A discovery filter of Discovery Response message may contain ProSe application code and ProSe application mask, and a ProSe application code of Discovery Response message or PC5 discovery message may contain ProSe application code. The ProSe application code may contain parameters not limited to public land mobile network (PLMN) ID of a ProSe function that assigned the ProSe application code and a temporary identity corresponding to the ProSe application ID name. The ProSe application code is used by a monitoring UE for full or partial matching of PC5 Discovery messages received on PC5 interface. The ProSe application ID name is used for identifying application related information for the ProSe-enabled UE. The ProSe application mask is a bitmask provided by the ProSe function in order to allow the monitoring UE to perform full or partial matching of PC5 Discovery messages received on the PC5 interface.

FIG. 1 shows a general call flow of a ProSe direct discovery procedure which is consistent with 3GPP TS 23.303 for example. In step S110, service authorization for ProSe direct services is performed for ProSe direct discovery. If the UE is authorized to announce, the UE would perform an announce request procedure (S130) to obtain a ProSe Application Code to be announced over the PC5 interface upon a request for announcing from upper layers. In step S131, when the UE is triggered to announce then it sends a discovery request for announcing to the ProSe Function in Home PLMN (HPLMN). In step S135, if the request is successful and is provided with ProSe Application Code then it starts announcing on PC5 interface. On the other hand, if the UE is authorised to monitor, the UE (such as an announcing UE) would perform a monitor request procedure (S150) to receive and process PC5 Discovery messages upon a request for monitoring from upper layers. PC5 Discovery message is transmitted from an announcing UE to a monitoring UE. In step S151, when the UE (such as a monitoring UE) is triggered to monitor, it sends a discovery request for monitoring to the ProSe Function. In step S155, if the request is successful and the UE is provided with a Discovery Filter consisting of ProSe Application Code(s) and/or ProSe Application Mask(s), the UE would start monitoring for these ProSe Application Codes on the PC5 interface. In step S170, when the monitoring UE detects that one or more ProSe Application Code(s) that match the discovery filter, the UE would send match report including the ProSe Application Code(s) to the ProSe Function. There is a match event when, for any of the ProSe Application masks in a Discovery Filter, the output of a bitwise AND operation between the ProSe Application Code contained in the PC5 Discovery message and this ProSe Application mask matches the output of a bitwise AND operation between the ProSe Application mask and the ProSe Application Code in the same discovery filter.

Accordingly, a successful direct discovery upon the match event occurs for the announcing UE and the monitoring UE would be determined by the ProSe Application Code contained in the PC5 Discovery message and the Discovery Filter provided by the ProSe function. There would be need to provide a method or an algorithm to generate those discovery codes for ProSe direct discovery.

SUMMARY OF THE DISCLOSURE

Accordingly, the present disclosure is directed to a method of generating discovery code for a network entity and a network entity using the same method.

In one of the exemplary embodiments, the present disclosure is directed to a method of generating discovery code which is used by a network entity and the method includes at least but not limited to selecting a first substring in a ProSe application code of an announcing UE and a second substring in a ProSe application code of a monitoring UE for a D2D discovery, generating a matching string and a non-matching string according to the first substring and the second substring, and generating a ProSe application mask according to the matching string and the non-matching string.

In one of the exemplary embodiments, the present disclosure is directed to a network entity, including at least but not limited to a transmitting module, a receiving module, and a processing circuit coupled to the transmitting module and the receiving module. The transmitting module is configured for transmitting data. The receiving module is configured for receiving data. The processing module is configured for at least but not limited to selecting a first substring in a ProSe application code of an announcing UE and a second substring in a ProSe application code of a monitoring UE for a D2D discovery, generating a matching string and a non-matching string according to the first substring and the second substring, and generating a ProSe application mask according to the matching string and the non-matching string.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
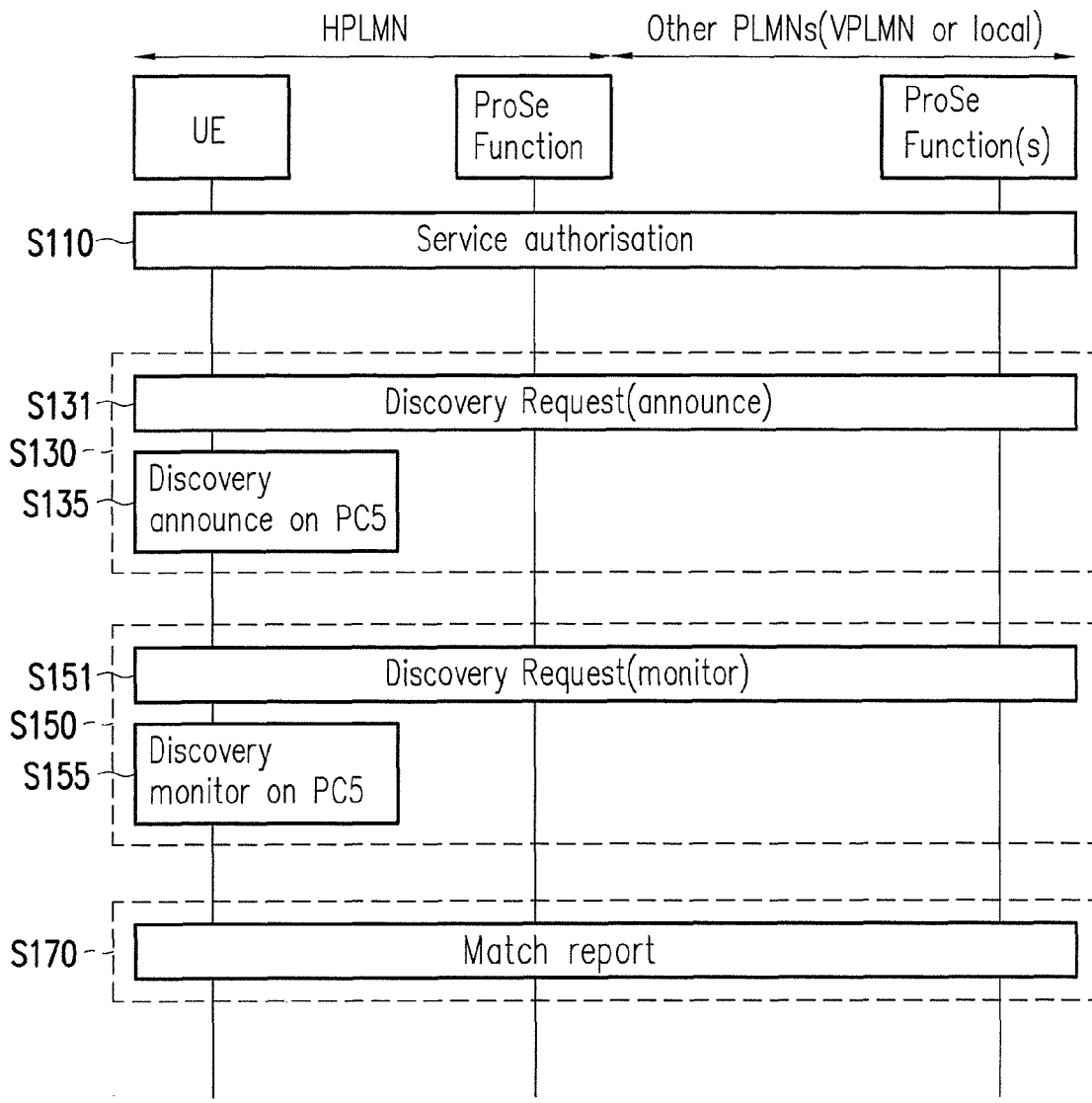
FIG. 1 shows a general call flow of a ProSe direct discovery procedure.

Reference will now be made in detail to the present preferred embodiments of the disclosure, examples of which are illustrated in the accompanying drawings. Wherever possible, the same reference numbers are used in the drawings and the description to refer to the same or like parts.

The present disclosure is a solution to generate discovery codes such as ProSe application codes and ProSe application mask. The solution may be used to generate codes and masks that can achieve match event, which means a UE can discovery another UE successfully. On the other hand, the solution is also used to generate codes and masks that can not achieve match event, so that a restricted discovery would be achieved. Reference will now be made to the present preferred embodiments of the disclosure, and it will be apparent to those skilled in the art that adjustments and applications can be correspondingly made to the following embodiments based on demands instead of being limited by the content in the following description.

Figure 2:
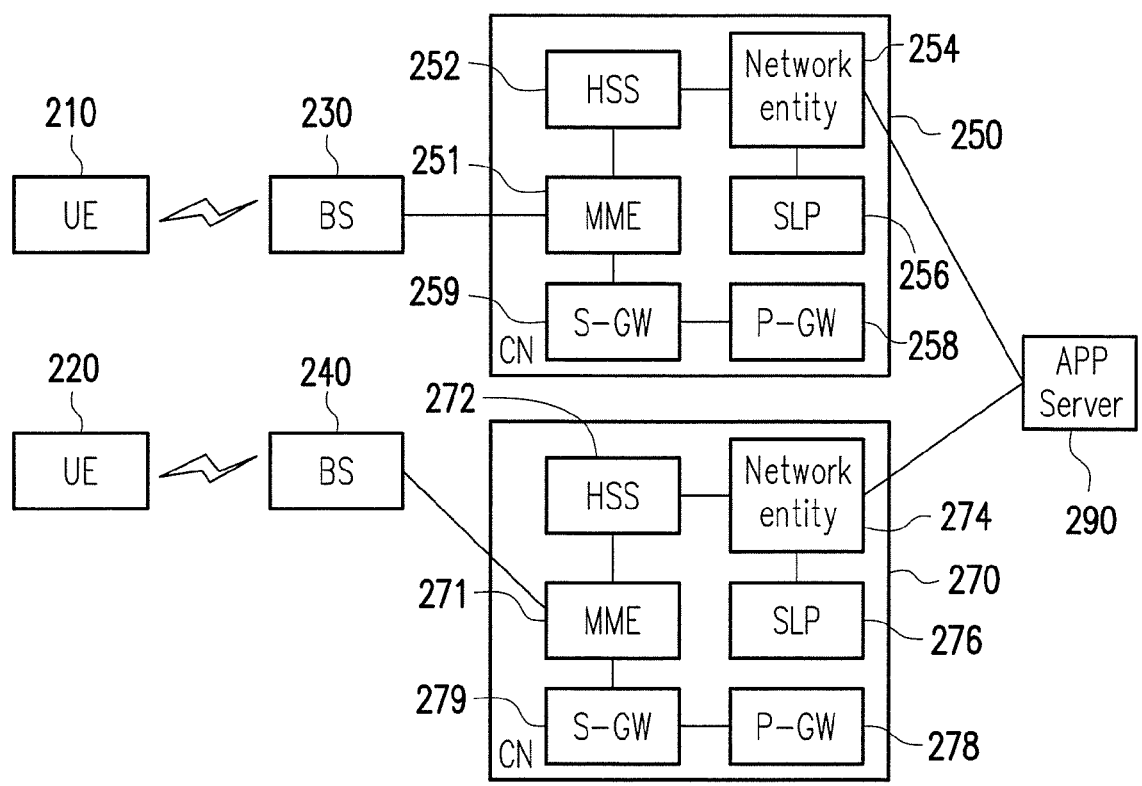
FIG. 2 is a schematic diagram illustrating a communication system in accordance with an embodiment of the present disclosure.

FIG. 2 is a schematic diagram illustrating a communication system in accordance with an embodiment of the present disclosure. Referring to FIG. 2, the communication system 200 could include but not limited to UEs 210 and 220, base stations (BSs) 230 and 240, core networks (CNs) 250 and 270, and a APP server 290.

The term "user equipment" (UE) such as UEs 210 and 220 in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

The term "base station" (BS) such as the BS 230 and 240 in this disclosure could represent various embodiments which for example could include but not limited to a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

The CNs 250 and 270 may be, for example, the, 2G CN such as GPRS core network, 3G CN, or 4G CN such as Evolved Packet Core (EPC). The CN 250 may contain at least but not limited to a mobility management entity (MME) 251, a Home Subscriber Server (HSS) 252, a network entity 254, a Secured User Plane Location Platform (SLP) 256, a Packet Data Network Gateway (P-GW) 258, and a Serving Gateway (S-GW) 259. The MME 251 is connected with the BS 230, the HSS 252, and the S-GW 259. The S-GW 259 is connected with the MME 251 and the P-GW 258. The network entity 254 is connected with the HSS 252, the SLP 256, and the APP server 290. Similarly, The CN 270 may contain at least but not limited to a MME 271, a HSS 272, a network entity 274, a SLP 276, a P-GW 278, and a S-GW 279. The coupling relation among the MME 271, the HSS 272, the network entity 274, the SLP 276, the P-GW 278, and the S-GW 279 could be referred to the coupling relation among the MME 251, the HSS 252, the network entity 254, the SLP 256, the P-GW 258, and the S-GW 259, and therefore detailed descriptions for each element will not be repeated.

Figure 3:
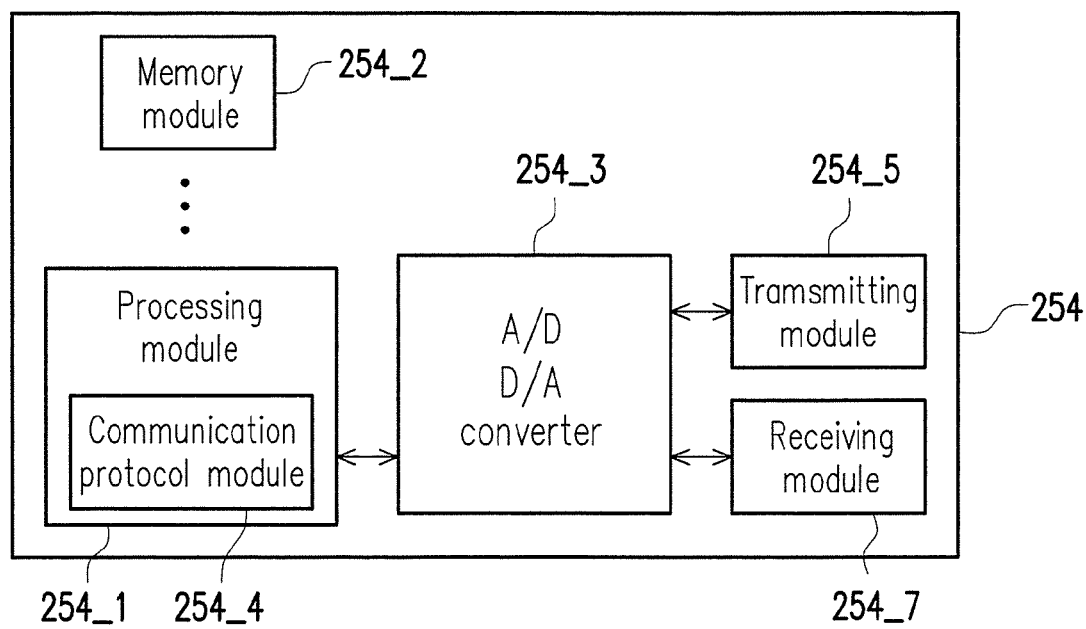
FIG. 3 illustrates an exemplary network entity in accordance with an embodiment of the present disclosure.

The exemplary network entities 254 and 257 could be ProSe Functions within an EPC network. The network entity 254 may be represented by at least the functional elements as illustrated in FIG. 3 in accordance with an embodiment of the present disclosure. The network entity 254 would include at least but not limited to a processing module 254_1, an analog-to-digital (A/D)/digital-to-analog (D/A) converter 254_3, a communication protocol module 254_4, a transmitting module 254_5, and a receiving module 254_7. The transmitting module 254_5 and the receiving module 254_7 is respectively used for transmitting and receiving modulated signals which could be wireless RF signals (through one or more antennas), optical signals, or signals sent over a cable. The transmitting module 254_5 and the receiving module 254_7 may also perform operations such as low noise amplifying, impedance matching, frequency mixing, up or down frequency conversion, filtering, amplifying, and so like. The A/D/D/A converter 254_3 is configured to convert from an analog signal format to a digital signal format during uplink signal processing and from a digital signal format to an analog signal format during downlink signal processing. The communication protocol module 254_4 could be independent from or an inherent part of the processing module 254_1 and would convert a digital message into a format that is compatible with various interfaces such as PC2, PC3, PC4, PC4x, and so forth. Those functions performed by the communication protocol module 254_4 may be implemented within the domains of either hardware or software. The processing module 254_1 is configured to process digital signal and to perform procedures of the proposed discovery code generating method described in the following in accordance with exemplary embodiments of the present disclosure. Also, the processing module 254_1 may optionally be coupled to a non-transitory memory module 254_2 to store programming codes, device configurations, a codebook, buffered or permanent data, ProSe application codes, ProSe application masks, discovery filters, and so forth. The functions of the processing module 254_1 could be implemented by using programmable units such as a micro-processor, a micro-controller, a DSP chips, FPGA, etc. The functions of the processing module 254_1 may also be implemented with separate electronic devices or ICs, and functions performed by the processing module 254_1 may also be implemented within the domains of either hardware or software.

Figure 4:
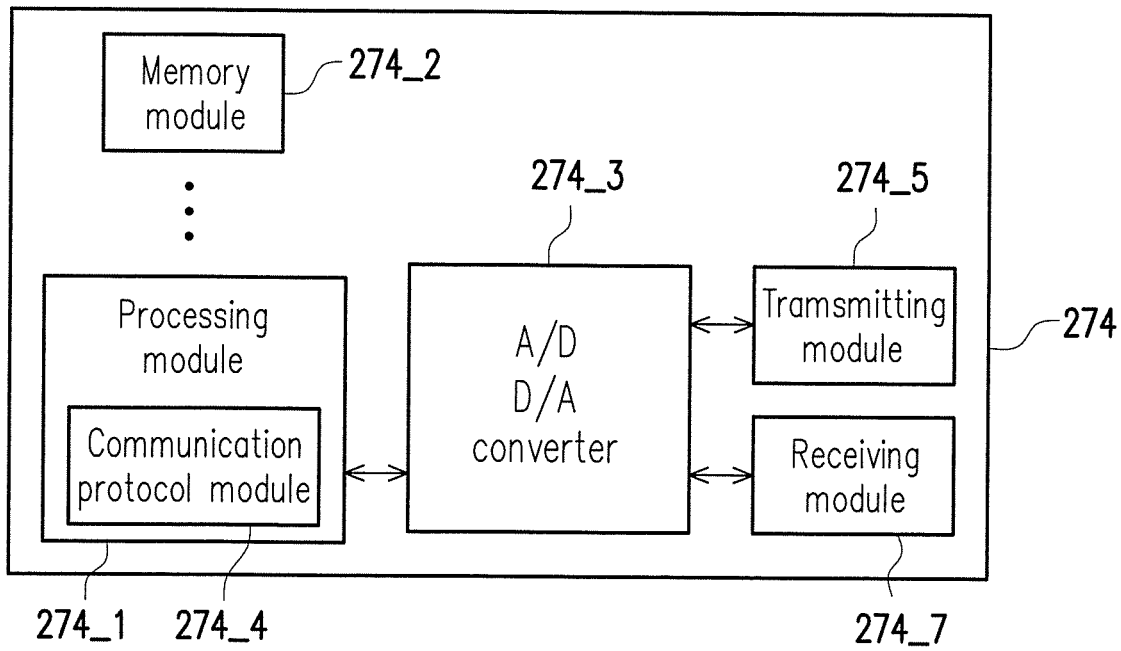
FIG. 4 illustrates an exemplary network entity in accordance with an embodiment of the present disclosure.

The network entity 274 may be represented by at least the functional elements as illustrated in FIG. 4 in accordance with an embodiment of the present disclosure. The network entity 274 would include at least but not limited to a processing module 274_1, a memory module 274_2, an A/D/D/A converter 274_3, a communication protocol module 274_4, a transmitting module 274_5, and a receiving module 274_7. The detailed description of functional elements of network entity 274 may be referred to the description of functional elements of the network entity 254 in FIG. 3, and therefore detailed descriptions for each element will not be repeated.

It should be noticed that, the aforementioned communication system 200 is assumed that the UEs 210 and 220 are belonged to the different CNs such as the CNs 250 and 270, that means the UEs 210 and 220 transmit and receive data or messages through the CNs 250 and 270, respectively. In some other embodiment of the disclosure, the UEs 210 and 220 may located within a network coverage of the BS 230 (or the BS 240), and the UE 210 and 220 both transmit and receive data or messages through the CN 250 (or the CN 270).

Figure 5:
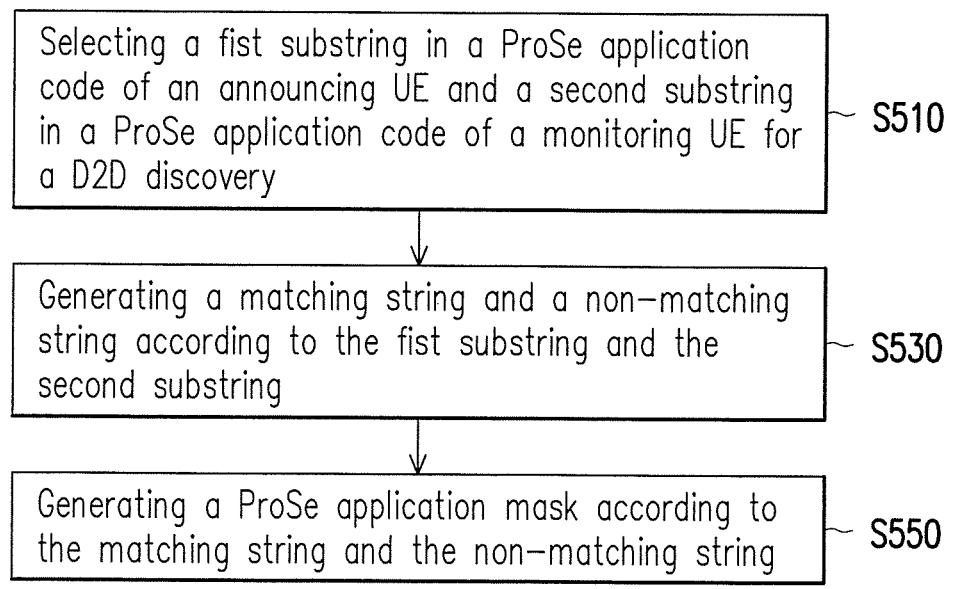
FIG. 5 is a flow chart illustrating method of generating discovery code for a network entity in accordance with an embodiment of the present disclosure.

FIG. 5 is a flow chart illustrating method of generating discovery code for a network entity such as the network entity 254 and 274 in accordance with an embodiment of the present disclosure. For convenience, in the following description, the network entity 254 would be used for performing the proposed generated method. However, the network entity 274 may perform the same or similar procedure as the network entity 254, and thus a repetition of descriptions will not be repeated. In step S510, the processing module 254_1 of the network entity 254 may select a first substring in a ProSe application code of an announcing UE and a second substring in a ProSe application code of a monitoring UE for a D2D discovery.

Specifically, in response to an announcing UE such as UE 210 being authorised to announce, UE 210 may transmit a Discovery Request message to the network entity 254 or the network entity 274 in HPLMN. The discovery request message may contain parameters not limited to a PoSe application ID, a UE identity, an announce command, application ID. The ProSe Application ID indicates what UE 210 is interested to announce. The UE Identity is set to e.g., International Mobile Subscriber Identity (IMSI). The IMSI is consists of a mobile country code (MCC), a mobile network code (MNC), and a Mobile Subscriber Identification Number (MSIN). The Application ID represents a unique identifier of the UE application that has triggered the transmission of the Discovery Request message.

On the other hand, in response to a monitoring UE such as UE 220 being authorised to monitoring, UE 220 may also transmit a Discovery Request message comprising PoSe application ID, UE ID, monitor command, application ID to the network entity 274 or the network entity 254 in HPLMN. The ProSe Application ID(s) indicate what UE 220 is interested to monitor and the ProSe Application ID(s) consist a subset of the data structure of the PLMN.

Then, the network entity 254 may check for the authorization of the application represented by the Application ID. If the Discovery Request is authorized, then the ProSe Function 254 would check whether UE 210 or 220 is authorized to use the ProSe Application ID contained in the Discovery Request. If UE 210 or 220 is authorised to use that ProSe Application ID, then the ProSe Function 254 would respond with a Discovery Response message. The Discovery Response message for the announcing UE may contain parameters not limited to a ProSe application code of the announcing UE corresponding to the requested ProSe application ID name and a validity timer. The Discovery Response message for the monitoring UE may contain parameters not limited to one or more discovery filters, where each discovery filter may contain parameters not limited to ProSe application code of the monitoring UE, ProSe application mask(s), filter ID, and TTL Timer such as T4002 which is consistent with 3GPP TS 24.334. The ProSe application code may contain at least but not limited to PLMN ID of ProSe Function 254 and a temporary ID, and may have a fixed length of 184 bits. The length of the temporary ID in the ProSe application ID code is equal to 184 bits minus the length of the PLMN ID in the ProSe application code. The length of the ProSe application mask is as same as the length of ProSe application code. The filter ID is assigned by the ProSe function, having local significance only to the ProSe function, in order for it to identify the discovery filter it has created based on a ProSe application ID. TTL Timer is Time-to-live duration for which the specified discovery filter is valid.

The processing module 254_1 may generate ProSe application codes of the announcing UE and the monitoring UE with proper values, respectively. For example, the PLMN ID part of the ProSe application codes is "12345" in decimal, and the temporary ID of the ProSe application codes is "101010 . . . 01" in binary. In an embodiment of the present disclosure, the processing module 254_1 may choose substrings X (such as the first substring) and Y (such as the second substring) from the ProSe application code (hereinafter as "P") of the announcing UE (which is to be the ProSe application code in PC5_DISCOVERY message) and the ProSe application code (hereinafter as "A") of the monitoring UE (which is to be the ProSe application code in discovery filter), respectively, where the range of the ProSe application codes for selecting (or the lengths of substrings X and Y) would be the same. For example, if the substring X is selected from range $21^{st}$ bit to $25^{th}$ bit of P, the substring Y would also be selected from range $21^{st}$ bit to $25^{th}$ bit of A. The substrings X and Y would be used for match event checking, and the detailed description would be described later.

In step S530, the processing module 254_1 may generates a matching string and a non-matching string according to the first substring and the second substring. In an embodiment of the present disclosure, the processing module 254_1 may generate the matching string in which a first bitwise AND operation output between the first substring and the matching string matches a second bitwise AND operation output of the second substring and the matching string, and generate the non-matching string in which a third bitwise AND operation output between the first substring and the non-matching string does not match a fourth bitwise AND operation output of the second substring and the non-matching string.

Specifically, in this embodiment, a match equation would be defined as equation (1):

$$(X\&S)=(Y\&S) \tag{1}$$

Where X, Y, and S are bit strings with the same length such as 5, 10, 15, etc. "&" is a bitwise ADD operation. Then, the match string would be defined as a bit string S can satisfy the equation (1).

In an embodiment of the present disclosure, the processing module 254_1 may find at least one first bit position in which at least one first value at the first bit position of the first substring is the same with at least one second value at the first bit position of the second substring. For example, it is assumed that substring X is "11001100" and substring Y is "10011010". The first values would contain "1" at the first position, "0" at the third position, "1" at the fifth position, and "0" at the eighth position of the substring X, and the second value would contain "1" at the first position, "0" at the third position, "1" at the fifth position, and "0" at the eighth position of the substring Y. The first bit positions would contain the first, third, fifth, and eighth positions. Then, the processing module 254_1 may set at least one third value at the first bit position of the matching string to "0" or "1". For example, the value of the first, third, fifth, and eighth positions of the matching string would be set to "1". Or, the value of the third, fifth, and eighth positions of the matching string would be set to "1", and the value of the first position of the matching string would be set to "0".

In addition, the processing module 254_1 may find at least one second bit position in which at least one fourth value at the second bit position of the first substring is different from at least one fifth value at the second bit position of the second substring. Taking substring X "11001100" and substring Y "10011010" as an example, the fourth values would contain "1" at the second position, "0" at the fourth position, "1" at the sixth position, and "0" at the seventh position of the substring X, and the fifth value would contain "0" at the second position, "1" at the fourth position, "0" at the sixth position, and "1" at the seventh position of the substring Y. The second bit positions would contain the second, fourth, sixth, and seventh positions. Then, the processing module 254_1 may set at least one sixth value at the second bit position of the matching string to "0" for the match string. For example, the values of the second, fourth, sixth, and seventh positions of the matching string would be set to "0". "10101001" and "00101001" would be examples for the matching string since the substring X is "11001100" and the substring Y is "10011010".

On the other hand, the non-matching string would be defined as a bit string S can not satisfy the equation (1). One of the difference settings between the matching string and the non-matching string is the processing module 254_1 would set at least one seventh value at the second bit position of the non-matching string to "1". For example, "01000000" and "11010001" would be the non-matching strings since the substring X is "11001100" and the substring Y is "10011010", where the seventh value is at the second position in first example, or the seventh values are at the second and fourth positions in the second example.

In step S550, the processing module 254_1 may generate a ProSe application mask according to the matching string and the non-matching string. Specifically, in response to generating the matching string and non-matching string, an application mask (hereinafter as "M") in discovery filter would be generated by the processing module 254_1. Then, according to the range of the ProSe application codes for respectively selecting the substrings X and Y in the ProSe application codes P and A, substring M" in the same range of application mask M would be set to S by the processing module 254_1. For example, if S is "10110" and the range chose the substrings X and Y from the ProSe application codes P and A is $21^{st}$ bit to $25^{th}$ bit, then the range $21^{st}$ bit to $25^{th}$ bit of application mask M would be set as S "10110". In addition, if the application mask M is to be configured for achieving the match event, the substring "M" may be set as the matching string. For example, since the substring X is "11001100" and the substring Y is "10011010", the substring "M" may be set to "10101001" for achieving the match event. On the other hand, if the application mask M is to be configured for not achieving the match event, the substring "M" may be set as the non-matching string. For example, since the substring X is "11001100" and the substring Y is "10011010", the substring "M" may be set to "01000000" for not achieving the match event.

It should be noted that, there may be more than one range (such as 2, 5 6 ranges) selected in the ProSe application codes P and A. For example, two ranges $21^{st}$ bit to $25^{th}$ bit and $46^{th}$ to $55^{th}$ bit are chosen, then two sets of substrings (X1, Y1) and (X2, Y2) would be selected, and the corresponding bit strings S1 and S2 would be generated, respectively. However, the ranges selected in the ProSe application codes P and A would not be overlapped. In addition, the ranges selected in the ProSe application codes P and A is especially chosen from the temporary ID part, and the PLMN ID part would not be chosen. And, other positions that are not chosen, the values at those positions of the application mask M would be set to "0", which means the values at those positions of the ProSe application codes P and A would not be compared.

The aforementioned method is described with a design of the application mask M, in some other embodiment of the present disclosure, the ProSe application codes P of the announcing UE could be modified for achieving or not achieving the match event, and the embodiment would be described later.

In an embodiment of the present disclosure, the processing module 254_1 may choose at least one of at least one third bit position of the ProSe application mask in which at least one eighth value at the third bit position of the ProSe application mask is "1", and inverting at least one ninth value at the third bit position of the ProSe application code of the announcing UE. For example, a set (P, A, M) of the ProSe application code of the announcing UE is provided, where the ProSe application code A of the monitoring UE, and the ProSe application mask M would achieve the match event. It is assumed that a part of the ProSe application mask M in range $20^{th}$ to $23^{rd}$ bit is "1001", and a part of the ProSe application code P in range $20^{th}$ to $23^{rd}$ bit is "1111". The eighth values would contain "1" at the $20^{th}$ position and "1" at the $23^{rd}$ position, and the third bit positions would be the $20^{th}$ and $23^{rd}$ positions. The part of the ProSe application code P in range $20^{th}$ to $23^{rd}$ bit would be set to "0110", where the values "1" at the $20^{th}$ and $23^{rd}$ positions are both inverted to "0". Or, the part of the ProSe application code P in range $20^{th}$ to $23^{rd}$ bit would be set to "0111", where the value "1" at the $20^{th}$ position is inverted to "0". Accordingly, a set (R, A, M) of the modified ProSe application code R, the ProSe application code A of the monitoring UE, and the ProSe application mask M would not achieve the match event. It should be noted that, this modified operation would not cause any change to the PLMN ID part of the ProSe application code P.

On the other hand, for achieving the match event successfully with the modified ProSe application code P, the processing module 254_1 may invert at least one tenth value at the third bit position of the ProSe application mask. For example, it is assumed that a part of the ProSe application mask M in range $36^{th}$ to $40^{th}$ bit is "10010", and values in the range $36^{th}$ to $40^{th}$ bit of the ProSe application code P is modified from "11111" to "01111". The part of the ProSe application mask M in range $36^{th}$ to $40^{th}$ bit would be modified to "00010", where the value "1" at the $36^{th}$ position is inverted to "0". According, a set (R, A, N) of the modified ProSe application code R, the ProSe application code A of the monitoring UE, and the modified ProSe application mask N would achieve the match event.

Subsequently, the ProSe application codes and the ProSe application masks could be respectively assigned for an open discovery and a restricted discovery according to aforementioned generated method. In an embodiment of the present disclosure, the processing module 254_1 may generate an open ProSe application code and a restricted ProSe application code according to the ProSe application code of the announcing UE for an open discovery and a restricted discovery, and generate an open ProSe application mask and a restricted ProSe application mask according to the ProSe application mask for the open discovery and the restricted discovery, respectively.

Specifically, it is assumed that PoSe application code Po is used for the open discovery, ProSe application code Pr is used for the restricted discovery, ProSe application mask Mm would match for PoSe application code Po but not match for ProSe application code Pr, and ProSe application mask Mn would match for PoSe application codes Pr and Po. A set (Po, A, Mm) of the ProSe application code Po, the ProSe application code A of the monitoring UE, and the ProSe application mask Mm would be generated according to the method of generating the set (P, A, M) of the ProSe application code P of the announcing UE, the ProSe application code A of the monitoring UE, and the ProSe application mask M with the matching string. Based on the generated set (Po, A, Mm) of the ProSe application code Po, the ProSe application code A of the monitoring UE, and the ProSe application mask Mm, a set (Pr, A, Mn) of the ProSe application code Pr, the ProSe application code A of the monitoring UE, and the ProSe application mask Mn would be generated according to the method of generating the set (R, A, N) of the modified ProSe application code R of the announcing UE, the ProSe application code A of the monitoring UE, and the ProSe application mask N.

Then, the ProSe application code Pr would be assigned to the announcing UE such as UE 210 which requests for the restricted discovery, and the ProSe application code Po would be assigned to the announcing UE which requests for the open discovery. For monitoring UE, if the monitoring UE such as UE 220 is the target UE that announcing UE want to discover in restricted discovery, at least one Mn would be added to the discovery filter assigned to this UE. Otherwise, only non-matching mask, that is, the ProSe application mask Mm, would be added to the discovery filter assigned to this UE. Accordingly, the announcing UEs which have requested for the restricted discovery would match with their restricted target UE, but would not match with non-target UE. The announcing UEs which have requested for open discovery can match with both target and non-target UE.

In view of the aforementioned descriptions, the present disclosure provides a method of generating discovery code for a network entity and a network entity using the same method. A matching string and a non-matching string would be generated based on the same values or different values at the corresponding positions of the ProSe application codes of the announcing UE and the monitoring UE. A part of the ProSe application mask would be set as the matching string or the non-matching string. Subsequently, ProSe application codes and ProSe application masks for the open discovery and restricted discovery would be assigned, respectively. Accordingly, the ProSe application codes and ProSe application masks based on the proposed generated method would be provided for achieving or not achieving the match event, and thus the open and restricted discovery would be achieved.

It should be noted that the adjectives "first", "second", "third", and so forth are simply used to distinguish one item or object from another and thus may or may not imply a sequence of events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of generating discovery code, used by a network entity in a core network, the generating method comprising:

selecting a first substring in a Proximity-based Services (ProSe) application code of an announcing User Equipment (UE) by choosing a plurality of first bits within a continuous range of the ProSe application code of the announcing UE and a second substring in a ProSe application code of a monitoring UE by choosing a plurality of second bits within a continuous range of the ProSe application code of the monitoring UE for a device to device (D2D) discovery;

generating a matching string and a non-matching string according to the first substring and the second substring; and generating a ProSe application mask according to the matching string and the non-matching string.

2. The method according to claim 1, wherein generating the matching string and the non-matching string according to the first substring and the second substring comprising:
generating the matching string in which a first bitwise AND operation output between the first substring and the matching string matches a second bitwise AND operation output of the second sub string and the matching string; and
generating the non-matching string in which a third bitwise AND operation output between the first substring and the non-matching string does not match a fourth bitwise AND operation output of the second substring and the non-matching string.

3. The method according to claim 2, wherein generating the matching string comprising:
finding at least one first bit position in which at least one first value at the first bit position of the first substring is the same with at least one second value at the first bit position of the second substring.

4. The method according to claim 3, wherein after finding the first bit position, the generating method further comprising:
setting at least one third value at the first bit position of the matching string to "0" or "1".

5. The method according to claim 2, wherein generating the matching string and the non-matching string according to the first substring and the second substring comprising:
finding at least one second bit position in which at least one fourth value at the second bit position of the first substring is different from at least one fifth value at the second bit position of the second substring.

6. The method according to claim 5, wherein after finding the second bit position, the generating method further comprising:
setting at least one sixth value at the second bit position of the matching string to "0".

7. The method according to claim 5, wherein after finding the second bit position, the generating method further comprising:
setting at least one seventh value at the second bit position of the non-matching string to "1".

8. The method according to claim 6, wherein after setting at least one sixth value at the second bit position of the matching string to "0", the generating method further comprising:
choosing at least one of at least one third bit position of the ProSe application mask in which at least one eighth value at the third bit position of the ProSe application mask is "1"; and
inverting at least one ninth value at the third bit position of the ProSe application code of the announcing UE.

9. The method according to claim 8, wherein after choosing at least one third bit position of the matching string, the generating method further comprising:
inverting at least one tenth value at the third bit position of the ProSe application mask.

10. The method according to claim 1, wherein after generating the ProSe application mask according to the matching string and the non-matching string, the generating method further comprising:
generating an open ProSe application code and a restricted ProSe application code according to the ProSe application code of the announcing UE for an open discovery and a restricted discovery, respectively; and
generating an open ProSe application mask and a restricted ProSe application mask according to the ProSe application mask for the open discovery and the restricted discovery, respectively.

11. A network entity in a core network, comprising:
a transmitting module, transmitting data;
a receiving module, receiving data;
a processing circuit, coupled to the transmitting module and the receiving module, and is configured at least for:
selecting a first substring in a ProSe application code of an announcing UE by choosing a plurality of first bits within a continuous range of the ProSe application code of the announcing UE and a second substring in a ProSe application code of a monitoring UE by choosing a plurality of second bits within a continuous range of the ProSe application code of the monitoring UE for a D2D discovery;
generating a matching string and a non-matching string according to the first substring and the second substring; and
generating a ProSe application mask according to the matching string and the non-matching string.

12. The network entity according to claim 11, the processing module is further configured at least for:
generating the matching string in which a first bitwise AND operation output between the first substring and the matching string matches a second bitwise AND operation output of the second substring and the matching string; and
generating the non-matching string in which a third bitwise AND operation output between the first substring and the non-matching string does not match a fourth bitwise AND operation output of the second substring and the non-matching string.

13. The network entity according to claim 12, the processing module is further configured at least for:
finding at least one first bit position in which at least one first value at the first bit position of the first substring is the same with at least one second value at the first bit position of the second substring.

14. The network entity according to claim 13, the processing module is further configured at least for:
setting at least one third value at the first bit position of the matching string to "0" or "1".

15. The network entity according to claim 12, the processing module is further configured at least for:
finding at least one second bit position in which at least one fourth value at the second bit position of the first substring is different from at least one fifth value at the second bit position of the second substring.

16. The network entity according to claim 15, the processing module is further configured at least for:
setting at least one sixth value at the second bit position of the matching string to "0".

17. The network entity according to claim 15, the processing module is further configured at least for:
setting at least one seventh value at the second bit position of the non-matching string to "1".

18. The network entity according to claim 16, the processing module is further configured at least for:
choosing at least one of at least one third bit position of the ProSe application mask in which at least one eighth value at the third bit position of the ProSe application mask is "1"; and
inverting at least one ninth value at the third bit position of the ProSe application code of the announcing UE.

19. The network entity according to claim 18, the processing module is further configured at least for:

inverting at least one tenth value at the third bit position of the ProSe application mask.

20. The network entity according to claim 11, the processing module is further configured at least for:
generating an open ProSe application code and a restricted ProSe application code according to the ProSe application code of the announcing UE for an open discovery and a restricted discovery, respectively; and
generating an open ProSe application mask and a restricted ProSe application mask according to the ProSe application mask for the open discovery and the restricted discovery, respectively.

\* \* \* \* \*

UNITED STATES PATENT AND TRADEMARK OFFICE
CERTIFICATE OF CORRECTION

PATENT NO. : 9,661,487 B2  
APPLICATION NO. : 14/834462  
DATED : May 23, 2017  
INVENTOR(S) : Chen Page 1 of 1

It is certified that error appears in the above-identified patent and that said Letters Patent is hereby corrected as shown below:

On the Title Page

The item (60) Related U.S. Application Priority Data
-- Provisional application No. 62/101,386, filed on January 9, 2015.-- should be shown.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*